United States Patent
Dewey et al.

(10) Patent No.: US 9,924,703 B2
(45) Date of Patent: Mar. 27, 2018

(54) RELEASABLE TWIST LOCKING INTERFACE

(71) Applicant: PET PRODUCT INNOVATIONS, LLC, Des Plaines, IL (US)

(72) Inventors: Alan J. Dewey, Everett, WA (US); Suman K. Shrestha, Marysville, WA (US)

(73) Assignee: ANIMAGANZA, LLC, Mukilteo, WA (US)

( * ) Notice: Subject to any disclaimer, the term of this patent is extended or adjusted under 35 U.S.C. 154(b) by 0 days.

(21) Appl. No.: 15/787,354

(22) Filed: Oct. 18, 2017

(65) Prior Publication Data

US 2018/0035646 A1 Feb. 8, 2018

Related U.S. Application Data

(62) Division of application No. 14/804,006, filed on Jul. 20, 2015.

(51) Int. Cl.
*A01K 15/02* (2006.01)
*F16B 7/20* (2006.01)

(52) U.S. Cl.
CPC .......... *A01K 15/026* (2013.01); *A01K 15/025* (2013.01); *F16B 7/20* (2013.01)

(58) Field of Classification Search
CPC .. A01K 15/026; A01K 15/025; A01K 5/0114; F16B 7/20; F16B 21/04
USPC .......... 119/707, 710, 709, 711, 702
See application file for complete search history.

(56) References Cited

U.S. PATENT DOCUMENTS

| | | | |
|---|---|---|---|
| 6,941,895 | B2 | 9/2005 | St. Pierre |
| 7,201,117 | B2 | 4/2007 | Ritchey |
| 7,389,748 | B2 | 6/2008 | Shatoff |
| 7,810,455 | B2 | 10/2010 | Axelrod |
| 8,701,599 | B2 | 4/2014 | Dewey |
| 2012/0204809 | A1 | 8/2012 | Axelrod |
| 2012/0272922 | A1 | 11/2012 | Axelrod |
| 2014/0130750 | A1 | 5/2014 | Valle |
| 2015/0128875 | A1* | 5/2015 | Christianson ........ A01K 5/0114 119/707 |
| 2016/0174527 | A1* | 6/2016 | Campbell ............ A01K 15/025 119/711 |
| 2017/0020109 | A1 | 1/2017 | Dewey |

* cited by examiner

*Primary Examiner* — Trinh T Nguyen
(74) *Attorney, Agent, or Firm* — Jensen & Puntigam, PS; Nathaniel A. Gilder

(57) ABSTRACT

Reconfigurable pet toy products and releasable twist-locking interfaces which may be used in connection with the reconfigurable pet toy products are disclosed. Some example reconfigurable pet toy products may comprise at least one middle piece, a first end piece, and a second end piece. The different pieces may couple with one another in multiple different configurations. The middle piece may include an internal cavity and a chew access window. The end pieces, when coupled with the middle piece according to one configuration, may provide closures for the internal cavity. In another configuration, the first and second end pieces may be coupled directly together, without the middle piece. In still further configurations, multiple middle pieces may be coupled together, and a variety of different middle pieces and/or end pieces may be mixed and matched.

5 Claims, 7 Drawing Sheets

RELEASABLE TWIST LOCKING INTERFACE

CROSS-REFERENCE TO RELATED APPLICATION

This application is a divisional which claims priority under 35 U.S.C. § 121 of U.S. patent application Ser. No. 14/804,006, entitled "RECONFIGURABLE PET TOY", filed on Jul. 20, 2015, which is incorporated by reference herein.

BACKGROUND

There are a variety of popular pet toy products available in pet supply stores. Pet "toys", such as balls, ropes, and rubber chew toys, are distinguished herein from pet "chews" such as bones, rawhides, bully sticks, and hardened cheeses, in that pet toys are not designed for consumption while pet chews are designed to be at least partially consumed. Himalayan Dog Chews, imported from Nepal and distributed in the United States by the Himalayan Corporation, are one example of hardened cheese pet chews generally made of yak or cow milk. While chews made of hardened cheese and other relatively tough materials can withstand the stress of being chewed for some time, it is nonetheless desirable to extend the life of chews, particularly for certain pets. Furthermore, it may be desirable add interest to chews by making them more challenging and/or entertaining. In general, there is an ongoing need to increase the variety of both pet toy and pet chew products to meet the needs and preferences available to dog and other pet owners.

SUMMARY

Reconfigurable pet toy products are disclosed, along with a novel releasable twist-locking interface which may be used in connection with the reconfigurable pet toy products. Some example reconfigurable pet toy products may comprise at least one middle piece, a first end piece, and a second end piece. The different pieces may couple with one another in multiple different configurations.

The middle piece may include, e.g., an internal cavity and a chew access window, wherein the chew access window provides chew access to the internal cavity from outside the middle piece. The end pieces, when coupled with the middle piece according to one configuration, may provide closures for the internal cavity so that a chew positioned inside the internal cavity is not removable by a pet via the chew access window.

In another configuration, the first and second end pieces may be coupled directly together, without the at least one middle piece. The end pieces may comprise a variety of different structures, e.g., kibble dispenser openings, handles, rings, or other pet toy structures which may engage pets when the first and second end pieces are coupled directly together, as well as when the first and second end pieces are coupled with the middle piece.

In still further configurations, multiple middle pieces may be coupled together, and a variety of different middle pieces and/or end pieces may be mixed and matched to allow pet owners to achieve different desired configurations for their specific pet's needs and preferences.

The various different pieces may couple with one another through interfaces at each of the pieces. The interfaces may comprise different type interfaces, e.g., male interfaces and female interfaces. The at least one middle piece may include multiple interfaces having different type interfaces, e.g., both a female interface and a male interface. The first and second end pieces may each have a different type interface, e.g., the first end piece may include a female interface while the second end piece may include a male interface, or vice versa. The use of different type interfaces for the middle piece and end pieces in this manner allows for coupling of multiple middle pieces as may be desired for some configurations, as well as direct coupling of the first and second end pieces, as may be desired for some configurations.

A releasable twist-locking interface may be used to couple middle pieces and/or end pieces together. Some example releasable twist-locking interfaces may comprise a female interface, a male interface, and a button releasable lock assembly at the male interface, as described herein. Additional aspects of this disclosure are described in further detail below.

BRIEF DESCRIPTION OF THE DRAWINGS

Various features and attendant advantages of the disclosed technologies will become fully appreciated when considered in conjunction with the accompanying drawings, in which like reference characters designate the same or similar parts throughout the several views, and wherein.

DETAILED DESCRIPTION

Figure 1:
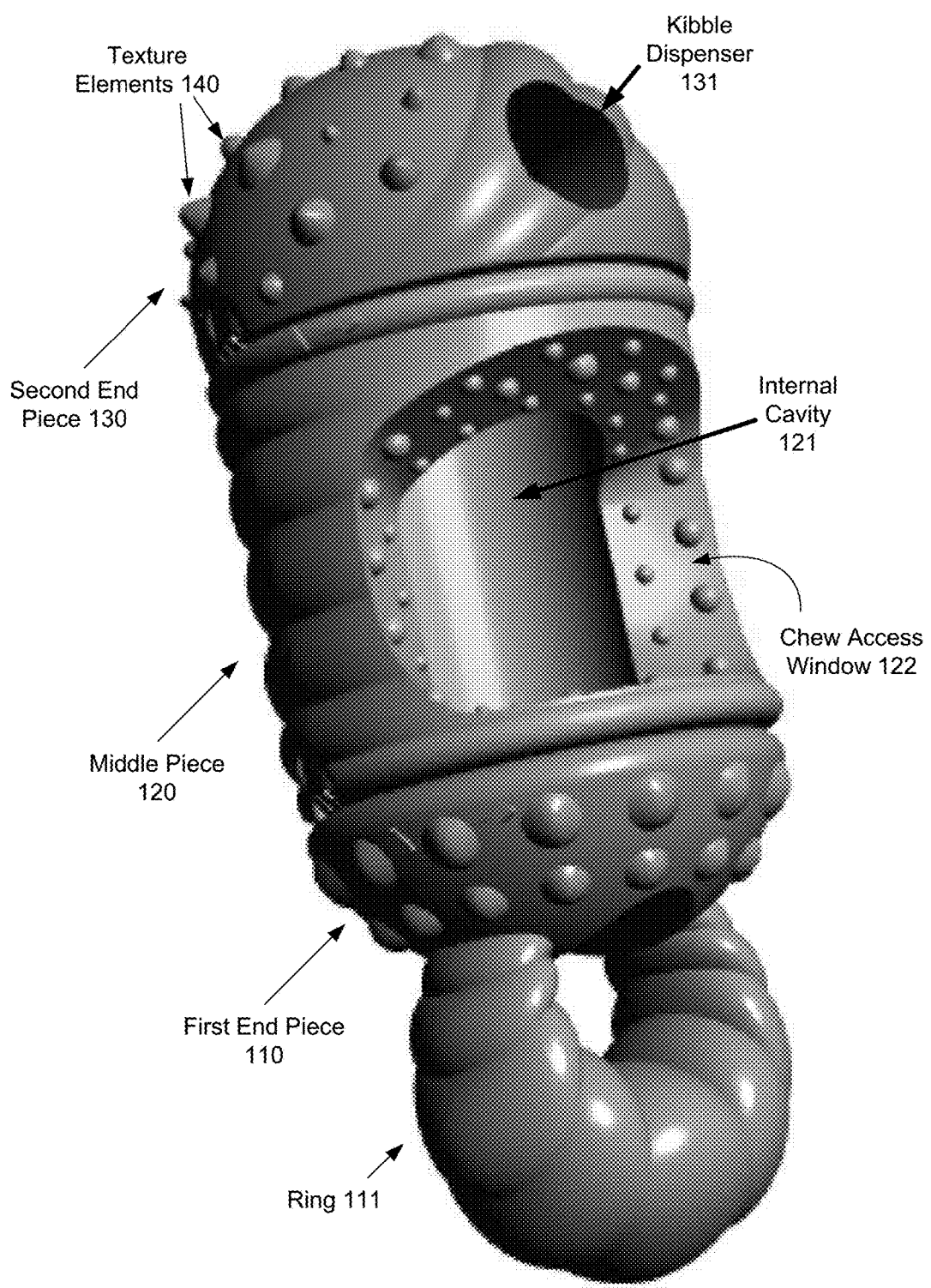
FIG. 1 illustrates an example reconfigurable pet toy product.

Prior to explaining embodiments of the invention in detail, it is to be understood that this disclosure is not limited to the details of construction or arrangements of the components and method steps set forth in the following description or illustrated in the drawings. Embodiments of this disclosure are capable of other embodiments and of being practiced and carried out in various ways. Also, it is to be understood that the phraseology and terminology employed herein are for the purpose of the description and should not be regarded as limiting.

FIG. 1 illustrates an example reconfigurable pet toy product 100 in accordance with at least some embodiments of the present disclosure. Reconfigurable pet toy product 100 comprises a first end piece 110, a middle piece 120, and a second end piece 130. Middle piece 120 comprises a proximal end and a distal end opposite the proximal end. The first end piece 110 is adapted to optionally couple with the middle piece 120 at the distal end, and the second end piece 130 is adapted to optionally couple with the middle piece 120 at the proximal end. The first end piece 110 may provide substantial closure of a distal end opening in the middle piece 120 when the first end piece 110 is coupled with the distal end, as shown. The second end piece 130 may provide substantial closure of a proximal end opening in the middle piece 120 when the second end piece 130 is coupled with the proximal end, as shown.

Middle piece 120 may comprise an internal cavity 121 which extends lengthwise through the middle piece 120, from the proximal end opening to the distal end opening. Middle piece 120 may furthermore comprise a chew access window 122 positioned in a sidewall thereof, between the proximal end and the distal end. The chew access window 122 may have a length shorter than the middle piece 120 and shorter than the internal cavity 121. The chew access window 122 may provide chew access to the internal cavity 121 from outside the middle piece 120.

First end piece 110 is illustrated with a ring 111. In some embodiments, a dental rope may be secured through ring 111. First end piece 110 may alternatively include any of a wide variety of other attached pet toy structures, attached at one or more of the first end piece or the second end piece. Example attached pet toy structures may comprise a plush attachment, a tug toy attachment, a hunting floater, a rubber structure, a mesh bag or flap, a hemp rope or fabric, a freezable attachment, a dental chew, a fling/fetch toy, a squeaker toy, an IQ puzzle, a tennis ball, an antler/bone holder, a light-up structure, a poo bag holder, an expandable water or food bowl, or a leash holder. In place of or in addition to ring 111. Second end piece 130 is illustrated with a kibble dispenser 131. Kibble dispenser 131 may comprise an opening which may be sized and shaped to allow kibble to pass through, e.g., one kibble at a time. When second end piece 130 is coupled directly with first end piece 110, kibble may be enclosed therein without falling from chew access window 122. Second end piece 130 may alternatively include any of a wide variety of other pet toy structures, such as any of the structures listed above, in place of or in addition to kibble dispenser 131.

In some embodiments, first end piece 110, middle piece 120, and second end piece 130 may each be made of a material comprising nylon. Materials incorporated in pet toy products according this disclosure may include rubber, nylon, plastic, and composites thereof, or optionally any other tough, non-toxic material than can withstand the stress of being chewed. Nylon is generally harder and stronger than rubber, and so in some embodiments, nylon or a nylon-based composite material may be used to make first end piece 110, middle piece 120, and second end piece 130. Meanwhile, the relative softness of rubber makes a good chewy surface for chewable pet toys, and so rubber or a rubber-based composite material may be incorporated into portions or elements of reconfigurable pet toy product 100 as may be desired.

Middle piece 120 may be substantially cylindrical, as shown, and internal cavity 121 may also be substantially cylindrical. Meanwhile, the first end piece 110 and the second end piece 130 may be substantially hemispherical, as shown. It will be appreciated that alternative middle piece 120 shapes, alternative internal cavity 121 shapes, and alternative first end piece 110 and second end piece 130 shapes may be used in some embodiments. For example, in some embodiments, middle piece 120 may comprise a cubic shape, a rectangular shape, an American football shape, or an irregular shape such as a shape resembling an animal or a robot. In some embodiments, internal cavity 121 may comprise a rectangular or other shape. First end piece 110 and second end piece 130 may comprise a cylindrical, spherical, cubic, rectangular, or any other shape. Irregular shapes may also be used in some embodiments. Furthermore, middle piece 120, first end piece 110, and/or second end piece 130 may comprise texture elements 140 such as ribs, bumps, or other texture elements, to impart a textured external surface.

Dimensions of reconfigurable pet toy products according this disclosure may vary depending on the sizes of the pets for which the reconfigurable pet toy products may be made. In some embodiments, the overall length of reconfigurable pet toy product may be about 16.6 centimeters (cm), including a second end piece 130 length of about 3.9 cm, a middle piece 120 length of about 6.0 cm, and a first end piece 110 length of about 6.7 cm. Other example dimensions may comprise, e.g., a width of first end piece 110, middle piece 120, and second end piece 130 of about 67.9 cm, and further example dimensions may be extrapolated from these example dimensions along with the various figures provided herein. Of course, dimensions of any of the pieces may vary +/−50% or more, and some embodiments may use entirely different dimensions.

Figure 2:
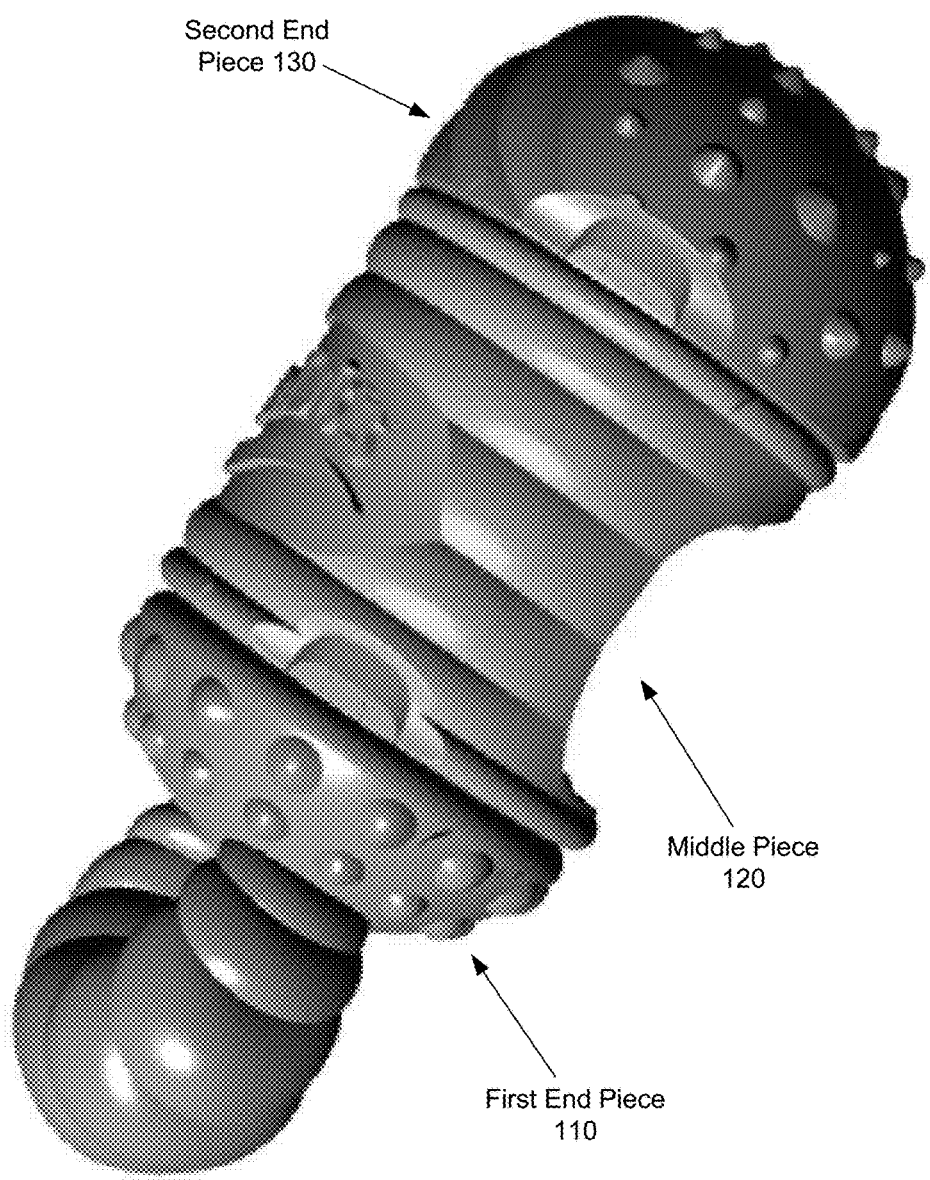
FIG. 2 illustrates another view of the example reconfigurable pet toy product illustrated in FIG. 1.

FIG. 2 illustrates another view of the example reconfigurable pet toy product 100 illustrated in FIG. 1. FIG. 2 provides another view of first end piece 110, middle piece 120, and second end piece 130. As in FIG. 1, middle piece 120 comprises a proximal end and a distal end opposite the proximal end. The first end piece 110 is adapted to optionally couple with the middle piece 120 at the distal end, and the second end piece 130 is adapted to optionally couple with the middle piece 120 at the proximal end. The first end piece 110 may provide substantial closure of a distal end opening in the middle piece 120 when the first end piece 110 is coupled with the distal end, as shown. The second end piece 130 may provide substantial closure of a proximal end opening in the middle piece 120 when the second end piece 130 is coupled with the proximal end, as shown.

Figure 3:
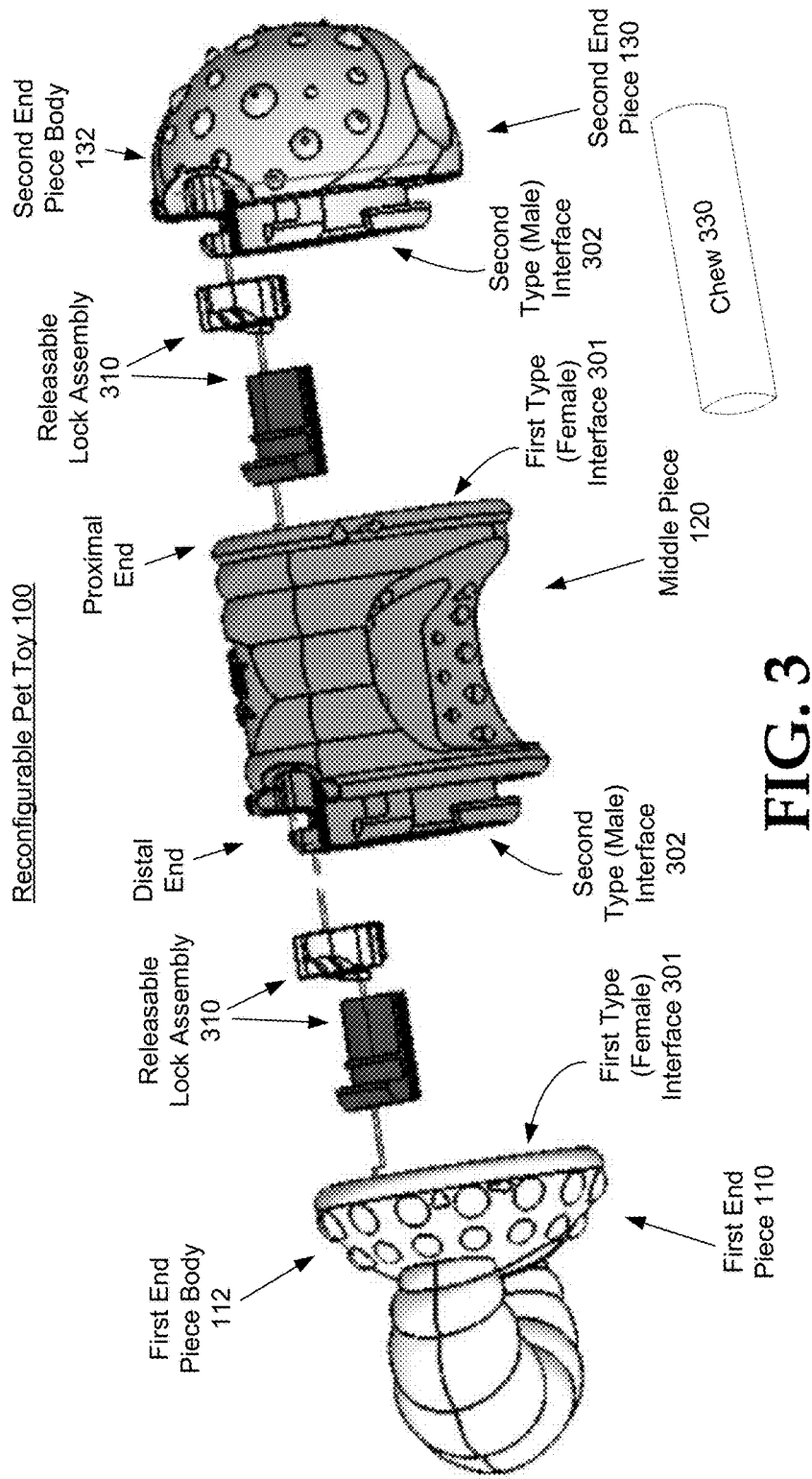
FIG. 3 illustrates an exploded view of the example reconfigurable pet toy product.

FIG. 3 illustrates an exploded view of the example reconfigurable pet toy product 100, in accordance with at least some embodiments of the present disclosure. FIG. 3 provides an exploded view of first end piece 110, middle piece 120, and second end piece 130, which shows various interfaces at first end piece 110, middle piece 120, and second end piece 130. For example, middle piece 120 is illustrated as having a second type interface 302, also referred to herein as a male interface, at a distal end of middle piece 120. Middle piece 120 is illustrated as having a first type interface 301, also referred to herein as a female interface, at a proximal end of middle piece 120. First end piece 110 is illustrated as having a first end piece body 112 and first type interface 301, also referred to herein as a male interface. Second end piece 130 is illustrated as having a second end piece body 132 and second type interface 302, also referred to herein as a male interface.

In FIG. 3, the at least one middle piece 120 comprises a proximal end and a distal end opposite the proximal end. The proximal end may comprise a proximal end opening (not shown in FIG. 3) surrounded by a proximal end interface, wherein the proximal end interface may comprise a first type interface 301. The distal end may comprise a distal end opening (not shown in FIG. 3) surrounded by a distal end interface, wherein the distal end interface may comprise a second type interface 302. An internal cavity 121, as indicated in FIG. 1, may extend lengthwise from the proximal end opening to the distal end opening. Also, a chew access window 122, as indicated in FIG. 1, may be positioned in a sidewall of the at least one middle piece 120, between the proximal end and the distal end, wherein the chew access window 122 may have a length shorter than the at least one middle piece 120 and shorter than the internal cavity 121, and wherein the chew access window 122 may provide chew access to the internal cavity 121 from outside the at least one middle piece 120.

Furthermore, first end piece 110 may comprise a first end piece body 112 and a first end piece interface comprising first type interface 301, wherein interfaces of the first type interface 301 may be adapted to couple with interfaces of the second type interface 302 such that the first end piece 110 is adapted to optionally couple with the at least one middle piece 120 at the distal end interface, and wherein the first end piece body 112 is adapted to provide substantial closure of the distal end opening when the first end piece 110 is coupled with the distal end interface.

Meanwhile, second end piece 130 may comprise a second end piece body 132 and a second end piece interface of the second type interface 302, such that the second end piece 130 may be adapted to optionally couple with the at least one middle piece 120 at the proximal end interface, and such that the second end piece 130 may be adapted to optionally couple with the first end piece 110, wherein the second end piece body 132 is adapted to provide substantial closure of the proximal end opening when the second end piece is coupled with the proximal end interface, and wherein the second end piece body 132 may be adapted to provide substantial closure of the first end piece 110 interface when the second end piece 130 is coupled with the first end piece 110 interface.

FIG. 3 furthermore illustrates releasable lock assemblies 310 to releasably lock interfaces of the first type interface 301 with interfaces of the second type interface 302 in order to prevent pet separation of the at least one middle piece 120 and the first end piece 110, or the at least one middle piece 120 and the second end piece 130. When the first end piece 110 is directly coupled with the second end piece 130, without the middle piece 120, a releasable lock assembly 310 may prevent pet separation of the first end piece 110 and the second end piece 130.

It will be understood, with reference to FIG. 3, that in some embodiments, the reconfigurable pet toy product 100 may be reconfigured so that the first end piece 110 may be directly coupled with the second end piece 130, without the middle piece 120. Furthermore, the reconfigurable pet toy product 100 may be reconfigured to include multiple middle pieces 120 which may be coupled together, wherein second type interfaces 302 are coupled with first type interfaces 301, and wherein the multiple middle pieces 120 may be capped at the ends by the first end piece 110 and the second end piece 130. Still further, a variety of differently shaped middle pieces and/or end pieces, or pieces with different attachments and features, may be mixed and matched to allow pet owners to achieve different desired configurations for their specific pet's needs and preferences.

FIG. 3 furthermore illustrates a chew 330, which is sized and shaped so that chew 330 may be positioned inside the internal cavity 121, wherein the chew 330 has a length longer than the length of the chew access window 122 in order to prevent pet removal of the chew 330 from the reconfigurable pet toy product 100 via the chew access window 122. Furthermore, when the openings at the ends of middle piece 120 are substantially closed by first end piece 110 and second end piece 130, the chew 330 may generally be irremovable from the reconfigurable pet toy product 100, unless the first end piece 110 or the second end piece 130 is removed.

It will be understood that the terms "distal end" and "proximal end" are used herein for clarity of the description, and that either end of middle piece 120 could be considered as the proximal or distal end. Furthermore, the first piece 110 and the second piece 130 could include any interface type—that is, in some embodiments, the first piece 110 could include a second type interface while the second piece 130 could include a first type interface. Also, the terms "male interface" and "female interface" can potentially be exchanged, because with complex interface structures it is not always clear which may be a "male" type versus a "female" type interface.

Figure 4:
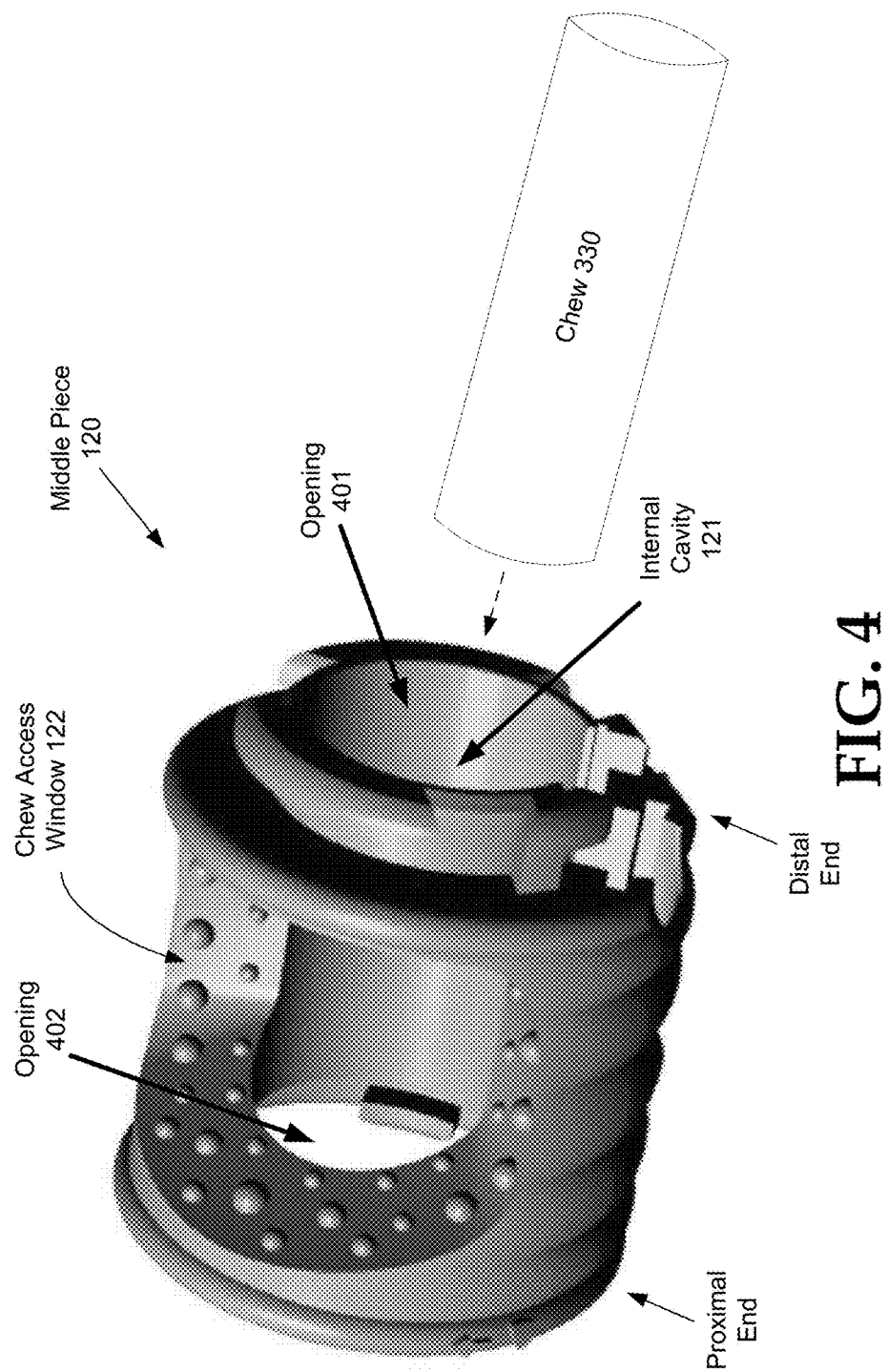
FIG. 4 illustrates a view of an example middle piece of a reconfigurable pet toy product, along with a chew which may be placed inside the middle piece.

FIG. 4 illustrates a view of an example middle piece 120 of a reconfigurable pet toy product, along with a chew 330 which may be placed inside the middle piece 130. Middle piece 120 is illustrated and distal and proximal ends thereof are indicated, as in FIG. 3. FIG. 4 illustrates a proximal end opening 402 at the proximal end, which opening may be surrounded by a proximal end interface such as the first type interface 301 on middle piece 120 indicated in FIG. 3. A distal end opening 401 may be surrounded by a distal end interface, such as the second type interface 302 on middle piece 120 indicated in FIG. 3. FIG. 4 also illustrates internal cavity 121 extending lengthwise from the proximal end opening 402 to the distal end opening 401. Chew access window 122 is positioned in a sidewall of the at least one middle piece 120, between the proximal end and the distal end, as described in connection with FIG. 1.

In FIG. 4, the chew 330 may be inserted into internal cavity 121 through either opening 401 or opening 402. The chew 330 may be any chew such as a bone, antler, rawhide, bully stick, or hardened cheese such as a Himalayan Dog Chew, or a composite of such chew materials. The chew 330 may be sized and shaped so that chew 330 may be positioned inside the internal cavity 121, wherein the chew 330 may have a length longer than the length of the chew access window 122 in order to prevent pet removal of the chew 330 from the reconfigurable pet toy product 100 via the chew access window 122. Furthermore, when the openings at the ends of middle piece 120 are substantially closed by first end piece 110 and second end piece 130, the chew 330 may generally be irremovable from the reconfigurable pet toy product 100, unless the first end piece 110 or the second end piece 130 is removed. Chew 330 may eventually be worn down and may fall from access window 122, and chew 330 may thereafter be replaced. Chews may be sold along with reconfigurable pet chew products or sold separately, and replacement chews of appropriate dimensions may be made and sold. Chew/access window dimensions?

In some embodiments, either of openings 401 or 402 may not exist in middle piece 120, or may be restricted in size. In such embodiments, chew 330 may be replaced from the other remaining opening, or the remaining non-restricted opening.

Figure 5:
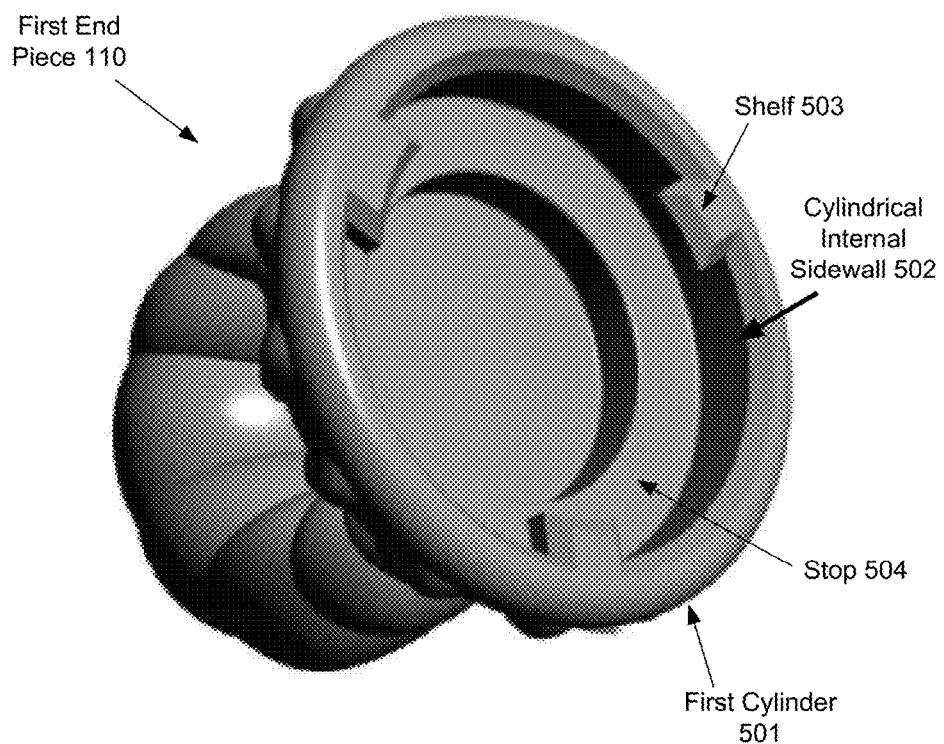
FIG. 5 illustrates an example first type interface.

FIG. 5 illustrates an example first type interface, in accordance with at least some embodiments of the present disclosure. The example first type interface may comprise one side of a releasable twist-locking interface, wherein the first type interface couples with a second type interface, also described herein. The example first type interface is illustrated at first end piece 110, however it will be appreciated that the example first type interface may alternatively be at one end of middle piece 120 or at second end piece 130.

The example first type interface may be referred to as a female interface. The female interface may comprise a first cylinder 501 having a cylindrical internal sidewall 502 with a first circumference. At least three inwardly protruding elements, illustrated in FIG. 5 as shelves including example shelf 503, may have separated positions about an end of the first cylinder 501. Shelves 503 may extend inwardly into the first cylinder 501 from the cylindrical internal sidewall 502. The female interface may further comprise a stop 504 inside the first cylinder 501 at a first distance from the end of the first cylinder 501.

Figure 6:
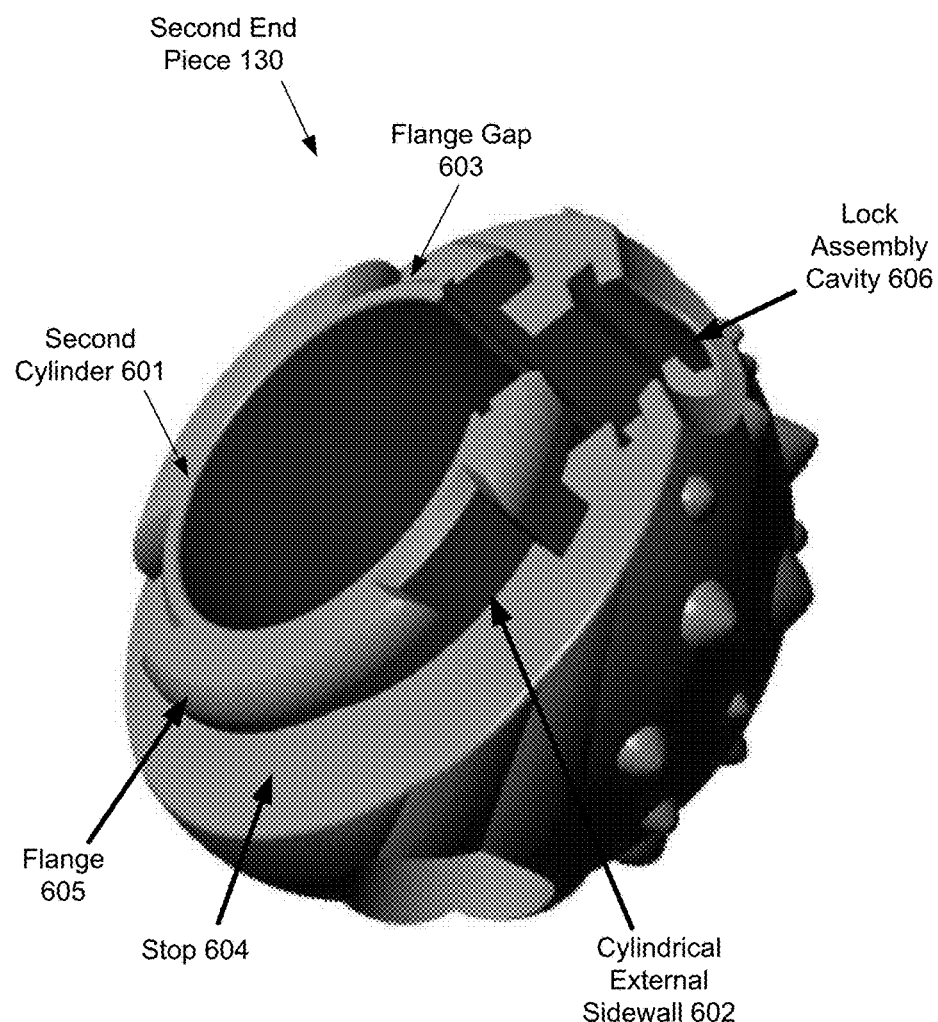
FIG. 6 illustrates an example second type interface.

FIG. 6 illustrates an example second type interface, in accordance with at least some embodiments of the present disclosure. The example second type interface may comprise an opposing side of a releasable twist-locking interface, wherein the second type interface couples with a first type interface. The example second type interface is illustrated at second end piece 130, however it will be appreciated that the example second type interface may alternatively be at one end of middle piece 120 or at first end piece 110.

The example second type interface may be referred to as a male interface. The male interface may comprise a second cylinder 601 having a cylindrical external sidewall 602 with a second circumference. The second circumference may fit inside internal edges of the at least three inwardly protruding elements at the female interface, e.g., the shelves 503 illustrated in FIG. 5. The male interface may further comprise a flange 605 extending outwardly from the cylindrical external sidewall 602, the flange 605 having an outer circumference substantially equal to the first circumference, that is, the circumference of the cylindrical internal sidewall 502 illustrated in FIG. 5. The flange 605 may have flange gaps therein including example flange gap 603. The flange gaps 603 may have sizes substantially equal to or greater than corresponding sizes of the at least three inwardly protruding elements 503. The flange gaps 603 may have separated positions matching the separated positions of the at least three inwardly protruding elements 503, to allow the at least three inwardly protruding elements 503 to pass through the flange gaps 603 and twist under the flange 605 to couple the male interface with the female interface. The male interface may further comprise a lock assembly cavity 606 and a stop 604 outside the second cylinder 601 at substantially the first distance from an end of the second cylinder 601, that is, at substantially a same distance as the distance of stop 504 (at the female interface) from the end of the first cylinder 501.

Figure 7:
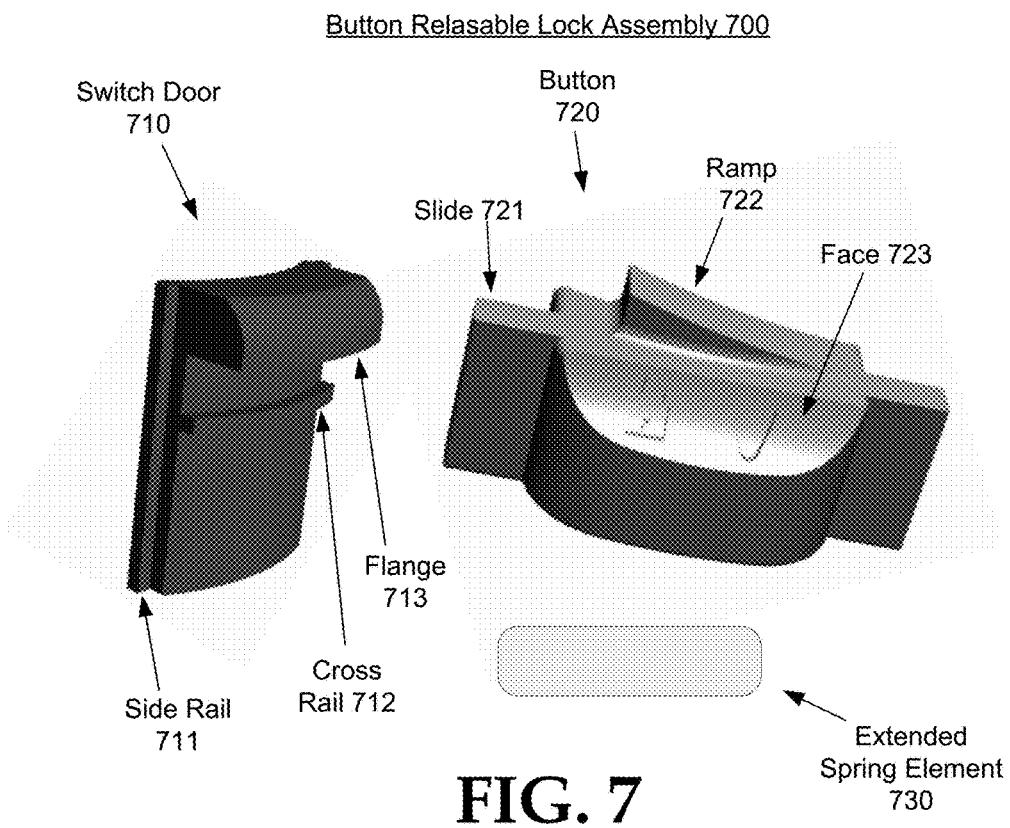
FIG. 7 illustrates an example button releasable lock assembly.

FIG. 7 illustrates an example a button releasable lock assembly 700, in accordance with at least some embodiments of the present disclosure. The button releasable lock assembly 700 may comprise button 720 and extended spring element 730. In some embodiments, the button releasable lock assembly 700 may also comprise switch door 710.

The various elements of button releasable lock assembly 700 may fit into lock assembly cavity 606, illustrated in FIG. 6. For example, switch door 710 may fit into lock assembly cavity 606 such that flange 713 aligns with the remainder of flange 605 and cross rail 712 may align with stop 604. Side rails 711 may slide into grooves in lock assembly cavity 606 to secure switch door 710 in place.

Extended spring element 730 may comprise, for example, a piece of compressible rubber or other compressible material. Extended spring element 730 may fit into lock assembly cavity 606, outside of switch door 710 and underneath button 720.

Button 720 may fit into lock assembly cavity 606, over the extended spring element 730 and with slides 721 on either side of button 720 sliding into slide grooves in lock assembly cavity 606 to secure button 720 in place, while also allowing button 720 to slide up and down. Button 720 may slide down when face 723 is depressed, compressing extended spring element 730, and button 720 may slide back up when face 723 is released, allowing extended spring element 730 to re-extend. Ramp 722 may slide up and down along with button 720. When button releasable lock assembly 700 is assembled in lock assembly cavity 606, ramp may be positioned under flange 713.

As can be understood from FIG. 7, button releasable lock assembly 700 may comprise a button 720 having a ramp 722 that forms a narrowing corridor along the flange 713, wherein a one of the inwardly protruding elements 503, as illustrated in FIG. 5, slides across the ramp 722 to a locked position when the at least three inwardly protruding elements 503 twist under the flange 605, 713 to couple the male interface with the female interface. Button releasable lock assembly 700 may further comprise an extended spring element 730 under the button 720, wherein the extended spring element 730 may compress when the button 720 is depressed to widen the narrowing corridor along the flange 713 and thereby release the one of the inwardly protruding elements 503 from the locked position, to thereby allow the at least three inwardly protruding elements 503 to twist in a reverse direction under the flange 605, 713 and decouple the male interface from the female interface. Conversely, the extended spring element 730 may extend when the button 720 is released to narrow the narrowing corridor along the flange 713 and thereby return the button 720 to a locking state.

Switch door 710 is optional—it allows for placement of the button releasable lock assembly 700 in the lock assembly cavity 606, however, other approaches may be used in some embodiments, such as insertion of button 720 and extended spring element 730 into lock assembly cavity 606 by a bottom access into lock assembly cavity 606. In embodiments comprising a switch door 710 similar to that illustrated in FIG. 7, switch door 710 may comprise a section of the male interface comprising a section of the cylindrical external sidewall 602 and flange 605 that secures the button releasable lock assembly 700. The switch door may be glued or otherwise adhered in place inside lock assembly cavity 606, thereby holding the button 722 and extended spring element 730 in place. The ramp 722 at the button 720 may form a narrowing corridor along the flange 713 at the switch door 710.

Figure 8:
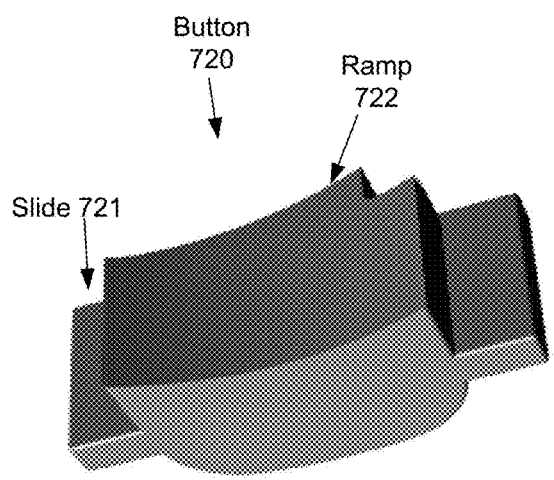
FIG. 8 illustrates another view of the example button illustrated in FIG. 7.

FIG. 8 illustrates another view of the example a button 722 illustrated in FIG. 7. FIG. 8 shows a cylindrical shaped back which may fit against switch door 710, or otherwise the cylindrical external sidewall 602 of the male interface. Slides 721 and ramp 722 are also shown in FIG. 8.

While various embodiments have been disclosed herein, other aspects and embodiments will be apparent to those skilled in art.

The invention claimed is:

1. A releasable twist-locking interface, comprising:
   a female interface, comprising:
      a first cylinder having a cylindrical internal sidewall with a first circumference; and
      at least three inwardly protruding elements having separated positions about an end of the first cylinder and extending inwardly into the first cylinder from the cylindrical internal sidewall;
   a male interface, comprising:
      a second cylinder having a cylindrical external sidewall with a second circumference, the second circumference fitting inside internal edges of the at least three inwardly protruding elements; and
      a flange extending outwardly from the cylindrical external sidewall, the flange having an outer circumference substantially equal to the first circumference, and the flange having flange gaps therein, wherein the flange gaps have sizes equal to or greater than corresponding sizes of the at least three inwardly protruding elements, and wherein the flange gaps have separated positions matching the separated positions of the at least three inwardly protruding elements to allow the at least three inwardly protruding elements to pass through the flange gaps and twist under the flange to couple the male interface with the female interface;

a button releasable lock assembly, comprising:

a button having a ramp that forms a narrowing corridor along the flange, wherein a one of the inwardly protruding elements slides across the ramp to a locked position when the at least three inwardly protruding elements twist under the flange to couple the male interface with the female interface; and an extended spring element under the button, wherein the extended spring element compresses when the button is depressed to widen the narrowing corridor along the flange and thereby release the one of the inwardly protruding elements from the locked position, to thereby allow the at least three inwardly protruding elements to twist in a reverse direction under the flange and decouple the male interface from the female interface;

wherein the extended spring element extends when the button is released to narrow the narrowing corridor along the flange and thereby return the button to a locking state.

2. The releasable twist-locking interface of claim 1, further comprising a switch door section of the male interface, the switch door section comprising a section of the cylindrical external sidewall and flange that secures the button releasable lock assembly, wherein the ramp at the button forms the narrowing corridor along the flange at the switch door section.

3. The releasable twist-locking interface of claim 1, wherein the at least three inwardly protruding elements at the female interface comprise shelves.

4. The releasable twist-locking interface of claim 1, wherein the extended spring element comprises a piece of compressible rubber.

5. The releasable twist-locking interface of claim 1, wherein the female interface comprises a stop inside the first cylinder at a first distance from the end of the first cylinder, and wherein the male interface comprises a stop outside the second cylinder at the first distance from an end of the second cylinder.

* * * * *